United States Patent
Banks, Jr. et al.

[15] 3,698,463
[45] Oct. 17, 1972

[54] TIRE RIM ASSEMBLY

[72] Inventors: Neill K. Banks, Jr.; Mark L. Standley, both of Gloucester, Mass.

[73] Assignee: Bomco, Incorporated, Gloucester, Mass.

[22] Filed: Sept. 17, 1969

[21] Appl. No.: 858,756

[52] U.S. Cl. ..................................................152/379
[51] Int. Cl. ..........................B60c 5/16, B60c 7/24
[58] Field of Search.....................152/401–409, 379, 152/380–396; 301/30, 31, 36, 95, 97

[56] References Cited

UNITED STATES PATENTS

| | | | |
|---|---|---|---|
| 454,092 | 6/1891 | Turner | 152/379 |
| 1,491,537 | 4/1924 | Killen | 152/403 |
| 2,576,270 | 11/1951 | Walklet | 152/380 |
| 2,912,032 | 11/1959 | Alexander | 152/379 |
| 3,382,009 | 4/1968 | Hawley et al. | 152/404 |
| 3,089,530 | 4/1963 | Kocher | 152/400 |
| 2,016,150 | 10/1935 | Lee | 152/375 |
| 2,068,947 | 1/1937 | Frank | 152/375 |
| 3,286,757 | 11/1966 | Thomas | 152/330 |

FOREIGN PATENTS OR APPLICATIONS

| | | | |
|---|---|---|---|
| 1,014,158 | 5/1952 | France | 152/379 |

Primary Examiner—Gerald M. Forlenza
Assistant Examiner—Richard A. Bertsch
Attorney—William N. Anastos

[57] ABSTRACT

This invention relates to a one-piece pneumatic tire and wheel assembly wherein two generally cup-shaped members are welded together back to back to form an airtight rim, and preferably wherein the edge of the rim and the bead of the tire are bonded to each other.

4 Claims, 1 Drawing Figure

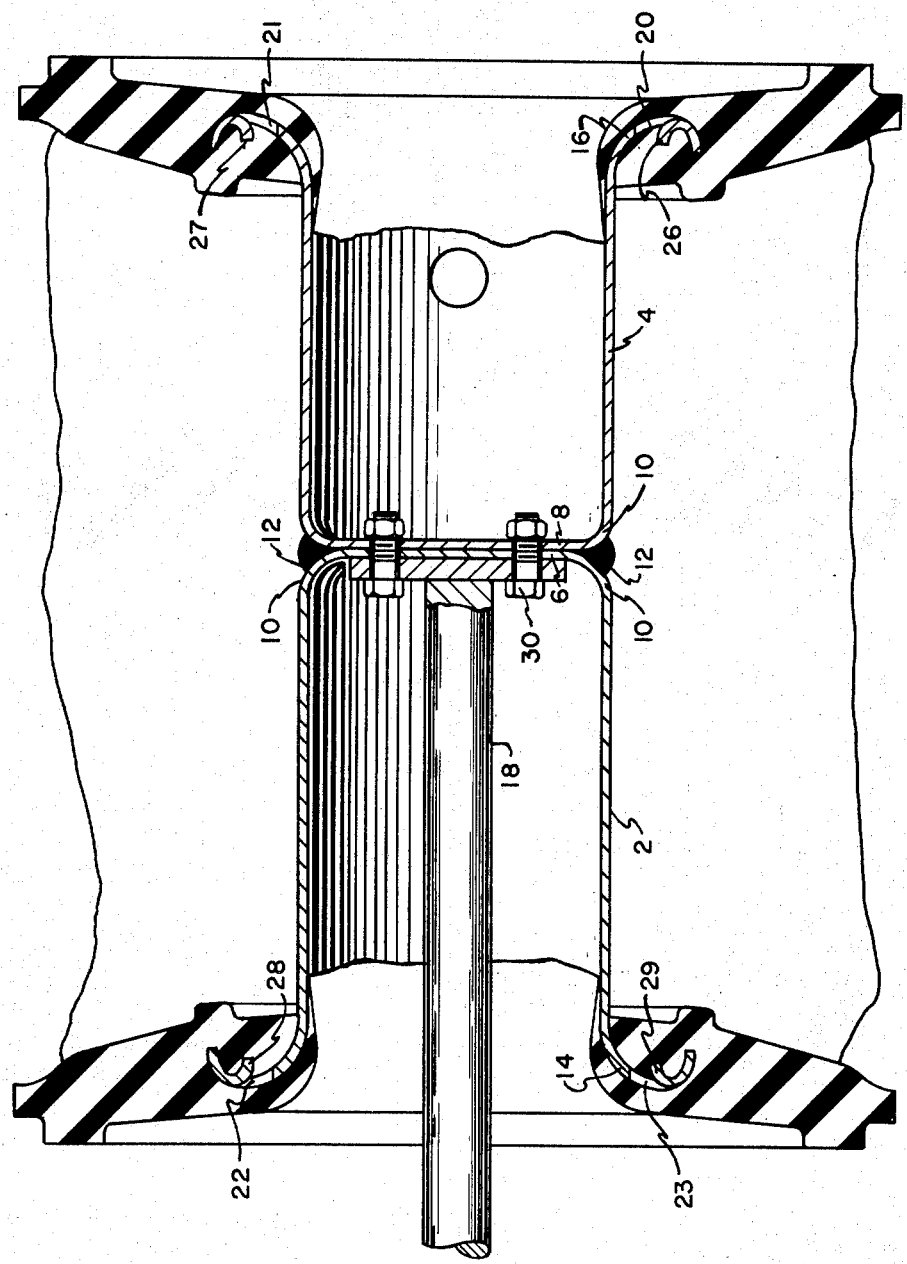

TIRE RIM ASSEMBLY

THE PRIOR ART

The desirability of forming an airtight rim by welding back to back two generally cup-shaped members has been recognized heretofore as evidenced by U.S. Pat. No. 3,286,757 which discloses an assembly wherein that portion of a rim between the beads of a tire and the inside of the tire form an airtight chamber. The assemblies disclosed in said patent suffer from a number of disadvantages, however. Specifically, for example, in the devices disclosed in said patent, the joint between the two cup-shaped members is not inherently airtight and the application of a sealing coat of polyurethane is required. The application of the sealing coat requires costly additional operations typically comprising cleaning the rim, applying a relatively complex polyurethane-forming reaction mixture under carefully controlled conditions, and reacting said mixture to obtain a seal coat. Also, when such prior art assemblies are utilized in connection with low pressure tires, it is very difficult to obtain and maintain an airtight seal between the rim and the bead of the tire. Finally, the devices disclosed in said patent cannot be conveniently mounted on a vehicle.

OBJECTS OF THE INVENTION

It is a principal object of this invention to provide an improved pneumatic tire/rim assembly.

It is another object of the present invention to provide a pneumatic tire/rim assembly wherein the rim comprises two generally cup-shaped members, the joint therebetween being inherently airtight.

It is another object of the present invention to provide a pneumatic tire/rim assembly which is a one-piece unit and which therefore is not subject to air leaks between the rim and the tire bead.

It is another object of the present invention to provide a one-piece pneumatic tire/rim assembly which can be mounted and dismounted from a vehicle quickly and easily.

It is still another object of the present invention to provide an improved low-pressure pneumatic tire/rim assembly.

Other objects will in part be obvious and will in part appear hereinafter.

GENERAL DESCRIPTION OF THE INVENTION

In accordance with the present invention two generally cup-shaped metal members each possessing flange means at the open end thereof are welded back to back and so as to form an entirely airtight seal, thereby rendering passage of air between the backs of the cup members impossible. The resulting rim assembly is not only relatively very strong, but further operations such as those normally involved in achieving airtightness are entirely circumvented. Hence, the resulting rim is also relatively easily and inexpensively produced.

Likewise in accordance with the present invention, the flange means at the open end of each cup member, which flange means are preferably perforated or slotted as will be explained in more detail hereinafter, are imbedded in, and are integral with, the "beads" of the tire. This construction feature provides a number of important advantages: In the first place, an airtight seal between the rim and tire even under difficult operating conditions is assured. This is particularly important when a low pressure tire (i.e., less than 10 psig and often as low as 1 to 2 psig) is involved, as low pressure tires deform more readily and thus it is often more difficult to maintain a seal between the bead of a low pressure tire and the rim.

In a preferred embodiment of the invention, the cup members to be utilized are produced by drawing mild steel and the flange means which comprise the normal draw radius have a plurality of apertures therein to permit the rubber which forms the integral bead/rim structure to pass through the flange means, as well as to be in contact with all the exposed surfaces thereof. These apertures contribute significantly to the strength and durability of the tire/rim assemblies of the present invention. In addition, and most preferably, the metal "removed" from the flange means to produce said apertures is not completely separated from the flange means, said metal remaining attached to the flange in the form of strength enhancing "tabs."

DETAILED DESCRIPTION OF THE INVENTION

Referring now to the drawing, two mild steel cup-shaped members 2 and 4, produced by deep drawing and each having an O.D. of about 3 inches are welded back 6 to back 8 respectively with a continuous airtight weld 12 which prevents leakage between surfaces 6 and 8 to form an airtight rim. The manner in which the welding is accomplished is not critical as airtight welding of adjacent metal surfaces is well known. The wall thickness of the cup-shaped members is likewise not critical, said thickness clearly being a function of the strength desired; in this case the wall thicknesses were about 0.070 inches. Where cups produced by drawing are utilized, however, arcuate surfaces 10 provide both great strength and a most convenient and desirably large surface area for welding. A high strength, airtight weld 12 is thus relatively readily achieved.

The flange means 14 and 16 need not be curved of course. Any flange means which provides a surface to which rubber can readily cling would suffice. When, however, the cup-shaped members are produced by drawing (as are those illustrated), a flange means of the type illustrated normally results. These flange means generally define the normal draw radius and serve admirably for the purposes of the present invention in that their semicircular shape "hooks" into the rubber tenaciously.

In accordance with a preferred embodiment of the present invention, flange means 14 and 16, whatever their shape, have slots or apertures therein as indicated at 20, 21, 22 and 23 through which the rubber composition flows during formation of airtight tire/rim bond. These apertures provide additional strength in the critical area of said bond.

Also, most preferably said apertures are formed by only partially removing and partially bending metal thereby forming tabs as illustrated at 26, 27, 28 and 29. Not only does providing said tabs additionally strengthen the rubber to rim relationship, but in addition frequently decreases fabrication costs. Processes suitable for forming said apertures or said apertures and said tabs are well known.

Mounting apertures in back surfaces 6 and 8 are preferably provided by providing the apertures in cup-shaped members 2 and 4 prior to welding thereof. The apertures should be positioned on said surfaces so that they coincide when members 2 and 4 are welded back to back. These apertures provide easy mounting means as illustrated in the drawing, wherein the entire tire/rim assembly is mounted on wheel 18 by means of bolts 30.

The material comprising cup-shaped members 2 and 4 is not critical. Generally, any metal which can be welded such as stainless steel, aluminum and most preferably mild steel will prove satisfactory. Likewise, the particular rubber composition utilized is not critical and does not comprise a portion of the present invention. Numerous entirely suitable rubber compositions are well known in the art.

Obviously, many changes and additions can be made to the above description and drawing without departing from the scope of the present invention. Accordingly, it is intended and should be understood that said description and drawing are not limiting of the present invention.

What is claimed is:

1. A strong one-piece pneumatic tire/metal rim assembly the metal rim portion of which comprises essentially only two metal cup-shaped members having integral flange means at the open ends thereof and matching apertures in the backs thereof for receiving wheel mounting bolts, said members being welded back to back in continuous and airtight fashion about the exterior circumference of the parting line established between said backs, and said flange means each being embedded in and forming an airtight seal with corresponding bead portions of a pneumatic rubber tire.

2. The assembly of claim 1 wherein said cup-shaped members were each produced by drawing and have arcuate exterior surfaces at the bases thereof and upon which arcuate surfaces said continuous weld is applied; and wherein said flange means are generally semi-circular in cross-section.

3. The assembly of claim 1 wherein said flange means each have a plurality of apertures therethrough through which apertures rubber of said corresponding bead portions of the pneumatic tire is embedded.

4. The assembly of claim 3 wherein said flange means each have additionally metal tabs projecting from the peripheries of said apertures and which tabs protrude into and are embedded in corresponding bead portions of the pneumatic rubber tire.

* * * * *